(12) United States Patent
Katsumata et al.

(10) Patent No.: US 6,830,233 B2
(45) Date of Patent: Dec. 14, 2004

(54) CONTROL APPARATUS OF ELECTROMAGNETIC DRIVE VALVE AND CONTROL METHOD OF THE SAME

(75) Inventors: Shoji Katsumata, Gotemba (JP); Isao Matsumoto, Susono (JP); Kazuhiko Shiratani, Susono (JP); Tametoshi Mizuta, Susono (JP); Keiji Yoeda, Numazu (JP); Makoto Ogiso, Mishima (JP); Hideyuki Nishida, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 142 days.

(21) Appl. No.: 10/225,147

(22) Filed: Aug. 22, 2002

(65) Prior Publication Data
US 2003/0038261 A1 Feb. 27, 2003

(30) Foreign Application Priority Data
Aug. 24, 2001 (JP) ........................... 2001-253872

(51) Int. Cl.$^7$ ............................................. F16K 31/02
(52) U.S. Cl. ............................. 251/129.1; 251/129.16; 123/90.52
(58) Field of Search ................... 251/129.16, 129.1; 123/90.52

(56) References Cited

U.S. PATENT DOCUMENTS

| 4,065,096 | A | * | 12/1977 | Frantz et al. ............ 251/129.1 |
|---|---|---|---|---|
| 4,382,240 | A | | 5/1983 | Kondo et al. |
| 5,669,341 | A | | 9/1997 | Ushirono et al. |
| 5,930,992 | A | | 8/1999 | Esch et al. |
| 5,996,539 | A | | 12/1999 | Gobel et al. |
| 6,024,059 | A | | 2/2000 | Kamimaru et al. |
| 6,026,771 | A | | 2/2000 | Escobosa |
| 6,070,853 | A | | 6/2000 | Stolk et al. |
| 6,082,315 | A | * | 7/2000 | Schneider ............ 251/129.16 |
| 6,089,197 | A | * | 7/2000 | Lange et al. ............ 251/129.1 |
| 6,125,803 | A | | 10/2000 | Hattori et al. |
| 6,230,673 | B1 | | 5/2001 | Sugimoto et al. |
| 6,230,674 | B1 | | 5/2001 | Hattori et al. |
| 6,257,182 | B1 | * | 7/2001 | Hara et al. ............ 251/129.1 |
| 6,289,858 | B1 | | 9/2001 | Altdorf et al. |
| 6,304,161 | B1 | | 10/2001 | Schebitz et al. |
| 6,354,253 | B1 | | 3/2002 | Katsumata et al. |
| 6,494,172 | B2 | | 12/2002 | Komatsu et al. |
| 6,553,966 | B2 | | 4/2003 | Cornell et al. |
| 2001/0004780 | A1 | | 6/2001 | Komatsu et al. |
| 2003/0217714 | A1 | | 11/2003 | Yoeda et al. |

FOREIGN PATENT DOCUMENTS

| JP | U 60-47808 | 4/1985 |
|---|---|---|
| JP | A 61-96110 | 5/1986 |
| JP | B2 61-53533 | 11/1986 |
| JP | 10288014 A | 10/1998 |
| JP | A 2000-97057 | 4/2000 |
| JP | A 2000-97059 | 4/2000 |
| JP | A 2000-248968 | 9/2000 |
| JP | A 2000-303807 | 10/2000 |
| JP | A 2001-254609 | 9/2001 |

OTHER PUBLICATIONS

Co–pending Application No. 10/423,976 (corresponds to US 2003/0217714 A1).

* cited by examiner

*Primary Examiner*—John Bastianelli
(74) *Attorney, Agent, or Firm*—Oliff & Berridge, PLC

(57) ABSTRACT

A rush adjuster which adjusts a relative position between a valve body and an armature in an axial direction so that a state of zero-rush is formed is arranged between an armature shaft and a valve shaft. At a time of starting an electromagnetic drive valve, a first starting current is applied to either one of an upper coil and a lower coil for generating electromagnetic forces for attracting the armature closer, whichever a distance with respect to the armature is shorter.

20 Claims, 3 Drawing Sheets

(A)            (B)

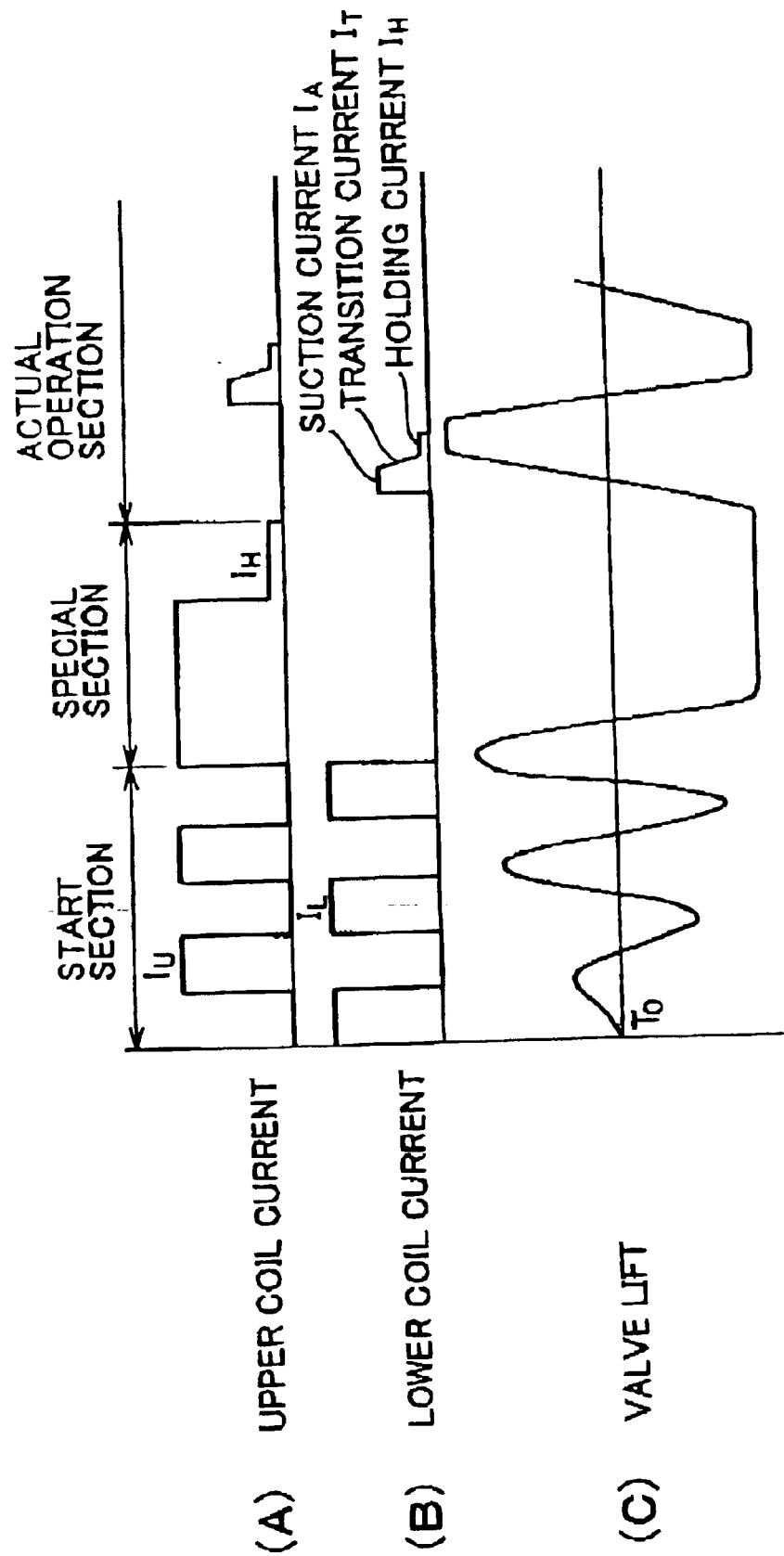

CONTROL APPARATUS OF ELECTROMAGNETIC DRIVE VALVE AND CONTROL METHOD OF THE SAME

INCORPORATION BY REFERENCE

The disclosure of Japanese Patent Application No. 2001-253872 filed on Aug. 24, 2001 including the specification, drawings and abstract are incorporated herein by reference in its entirety.

BACKGROUND OF THE INVENTION

1. Field of the Invention

The invention relates to a control apparatus of an electromagnetic drive valve, and more particularly to a control apparatus of an electromagnetic drive valve which drives a valve body serving as an intake valve or an exhaust valve in an internal combustion engine on the basis of an electromagnetic force, and a control method of the same.

2. Description of the Related Art

Conventionally, as a related art, an electromagnetic drive valve provided with a rush adjuster, for example, as disclosed in Japanese Patent Laid-Open Publication No. 2000-24896 is known. A conventional electromagnetic drive valve is provided with a valve body serving as an intake valve or an exhaust valve in an internal combustion engine, and a mechanism for driving the valve body on the basis of an electromagnetic force.

The mechanism for driving the valve body on the basis of the electromagnetic force includes an armature, and an upper coil and a lower coil which are arranged apart from each other above and under the armature. The armature is held so as to be displaceable in an axial direction, and a lower end thereof is connected to the valve body via the rush adjuster.

In the mechanism in which no rush adjuster is provided, and the valve body and the armature can not be relatively displaced in length, there is a case that the valve body can not move to a full-close position due to an influence of thermal expansion and the like. The rush adjuster absorbs the influence of the thermal expansion and the like, and adjusts a relative position between the armature and the valve body so that the valve body can always move to a suitable position. Accordingly, in accordance with the electromagnetic drive valve provided with the rush adjuster, it is possible to always open and close the valve body in a suitable manner without being affected by the thermal expansion and the like.

Meanwhile, in the electromagnetic drive valve provided with the rush adjuster, there is a case that a position of the armature in an axial direction is offset to either upward or downward directions from a center of the upper coil and the lower coil in accordance with expansion and contraction of the rush adjuster. In this case, when uniformly applying an exciting current to both of the upper coil and the lower coil, an unnecessarily large electromagnetic force is generated between one coil and the armature, and an electromagnetic force generated between another coil and the armature becomes excessively small.

In the publication mentioned above, in order to solve the unbalance of the electromagnetic force, there is disclosed an art for reducing the exciting current supplied to the coil that is closer to the armature, while increasing the exciting current supplied to the coil that is away from the armature, in the case that the position of the armature is offset to either upper or lower directions from the middle position between the upper coil and the lower coil. In accordance with this art, it is possible to balance the electromagnetic forces generated between the armature and two coils so as to efficiently drive the electromagnetic drive valve, irrespective of the offset of the armature position.

However, the related art mentioned above consistently corresponds to an art for efficiently opening and closing the valve body in the case that the position of the armature deviates from a middle position, and does not correspond to an art for efficiently starting the electromagnetic drive valve under a condition where the position of the armature deviates form the middle position. Further, with respect to an efficient starting of the electromagnetic drive valve under such a condition, there still remained a room for further improvement.

SUMMARY OF THE INVENTION

The invention is made for the purpose of solving the problem as mentioned above, and an object of the invention is to provide a control apparatus of an electromagnetic drive valve which can efficiently start an electromagnetic valve in the case that a position of an armature deviates from a middle position.

A description will be given below of means for achieving the aforementioned abject and an effect thereof.

In accordance with an aspect of the invention, a control apparatus of an electromagnetic drive valve comprises a valve body which is provided in an electromagnetic drive valve, a valve shaft which is fixed to the valve body, an armature which slides along an axial direction of the valve shaft, a rush adjuster which adjusts a relative position between the valve body and the armature in an axial direction so that a state of zero-rush is established, an upper coil which is arranged above the armature so as to generate an electromagnetic force for attracting the armature closer, a lower coil which is arranged under the armature so as to generate an electromagnetic force for attracting the armature closer, and a starting current application portion which applies a staring current at first to either the upper coil or the lower coil, whichever is closer to the armature, at a time of starting the electromagnetic drive valve.

BRIEF DESCRIPTION OF THE DRAWINGS

FIG. 3 is a timing chart which shows a waveform of an electric current which an ECU shown in FIG. 1 supplies to the upper coil and the lower coil at a time of starting the electromagnetic drive valve, also shows a motion of the valve body caused at that time.

DESCRIPTION OF THE PREFERRED EMBODIMENT

Figure 1:
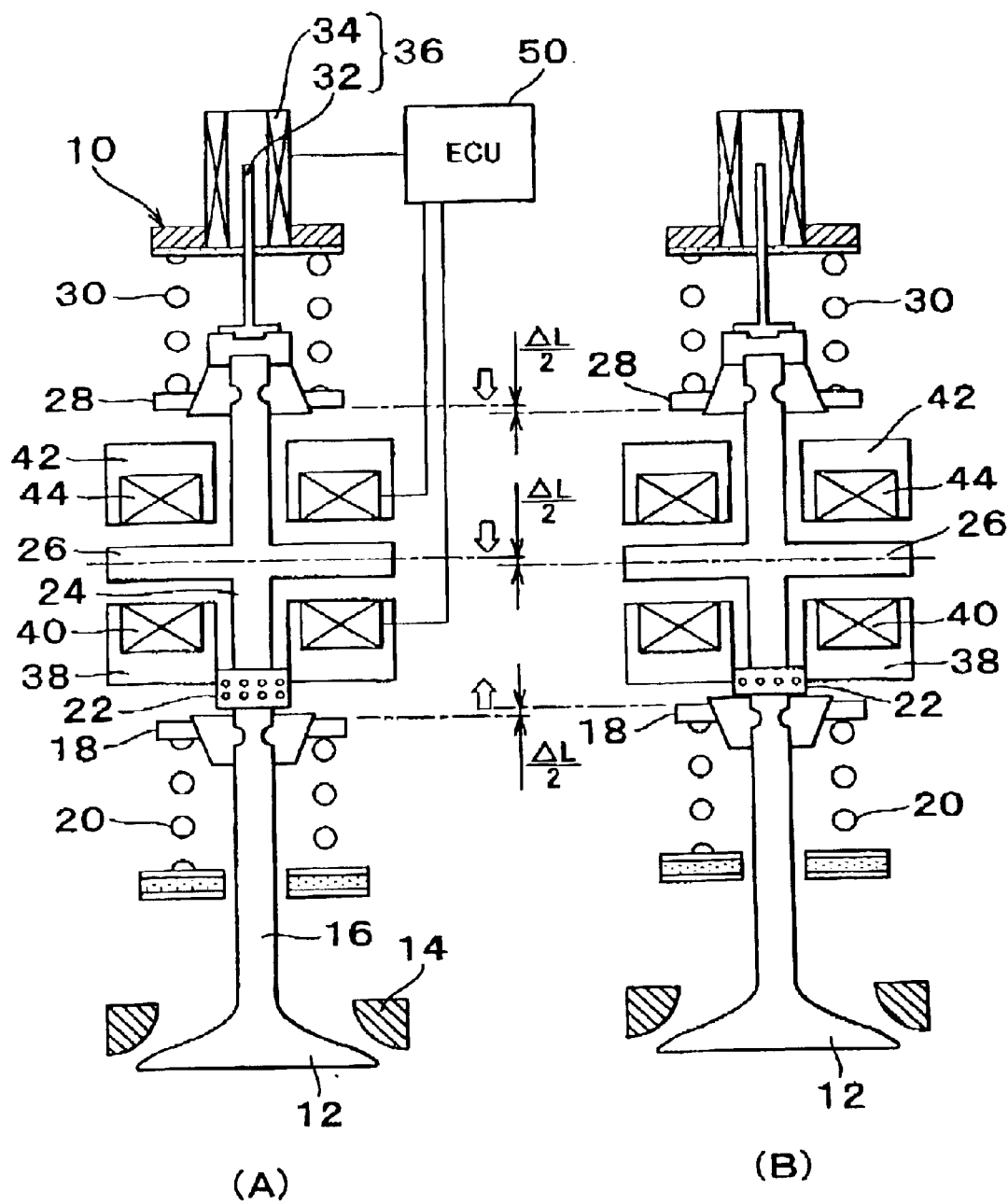
FIG. 1 is a schematic end surface view which shows a structure and an operation of an embodiment 1 according to the invention.

A description will be given below of an embodiment according to the invention with reference to the accompanying drawings. In this case, the same reference numerals are used to refer to common elements in the respective drawings, and thereby repeated descriptions will be omitted.

Embodiment 1

FIG. 1(A) is a view for illustrating a structure of an electromagnetic drive valve 10 used in an embodiment 1 according to the invention.

The electromagnetic drive valve 10 slain FIG. 1(A) is provided with a valve body 12 which serves as an intake valve ox an exhaust valve in an internal combustion engine. The valve body 12 is fixed to an end of a valve shaft 16. The valve shaft 16 is held by a valve guide (not shown) in such a manner as to be capable of sliding in a vertical direction. A lower retainer 18 is fixed to an upper end of the valve shaft 16. A lower spring 20 which generates an elastic force for pushing the valve shaft 16 upward is arranged under the lower retainer 18. The valve body 12 closes an intake port or an exhaust port in the internal combustion engine by being seated on a valve seat 14.

An upper end of the valve shaft 16 further connected to an armature shaft 24 via a rush adjuster 22. The rush adjuster 22 has a function of appropriately expanding and contracting is necessary so as to suitably change a relative position between the valve shaft 16 and the armature shaft 24. A structure of the rush adjuster 22 will be described in detail later with reference to FIG. 2.

The armature shaft 24 is provided so as to extend along a center axis of the armature 26. The armature 26 is a disc-like member made of a magnetic material. An upper retainer 28 is fixed to an upper end of the armature shaft 24. An upper spring 30 which generates an elastic force for pushing the armature shaft 24 downward is arranged above the upper retainer 28.

Further, a position sensor 36, for example, of a differential transformer type which has a magnetic shaft 32 operating together with the armature shaft 24 and a detection coil 34 surrounding a magnetic shaft 32 is provided above the upper retainer 28. In accordance with the position sensor 36, it is possible to detect a position of the armature 26 in an axial direction.

A lower core 38 and a lower coil 40 are arranged under the armature 26. Further, an upper core 42 and an upper coil 44 are arranged above the armature 26. The lower coil 40 and the upper coil 44 are connected to an ECU (electronic control unit) 50 together with the position sensor 36 mentioned above.

The ECU 50 can detect a position of the armature 26 in an axial direction on the basis of an output from the position sensor 36, and can supply an exciting current to the lower coil 40 and the upper coil 44 in accordance with respective desired waveforms so as to drive the electromagnetic drive valve 10.

FIG. 1(A) shows a state in which the exciting current it supplied to none of the lower coil 40 and the upper coil 44. Further, FIG. 1(A) shows a state in which the rush adjuster 22 is adjusted in a self-aligned manner to a proper length, that is, a length for seating the valve body 12 on the valve seat 14 at a time when the armature 26 is attached to the upper core 42. In this state, as shown in FIG. 1(A), respective portions of the electromagnetic drive valve 10 are adjusted so that the armature 26 is positioned substantially in the middle position between the lower core 38 and the upper core 42.

When the suitable exciting current is supplied, for example, to the lower coil 40, the electromagnetic drive valve 10 attracts the armature 26 to a side of the lower core 38 so as to bring the valve body 12 in a full-open state. When the current application to the lower coil 40 is stopped in this state, the armature 26 moves to a position close to the upper core 42 on the basis of the elastic forces of the lower spring 20 and the upper spring 30. When supplying the exciting current to the upper coil 44 at a timing at which the armature 26 moves close to the upper core 42, the armature 26 can be attracted to the side of the upper core 42 so as to displace the valve body 12 to a full-close position. Thereafter, the opening and closing operation of the valve body 12 can be continued with little electric power consumption by alternately executing the shut-off and the supply of the exciting current between the upper coil 44 and the lower coil 40.

Next, a description will be given of a structure and a function of the rush adjuster 22 with reference to FIG. 2.

Figure 2:
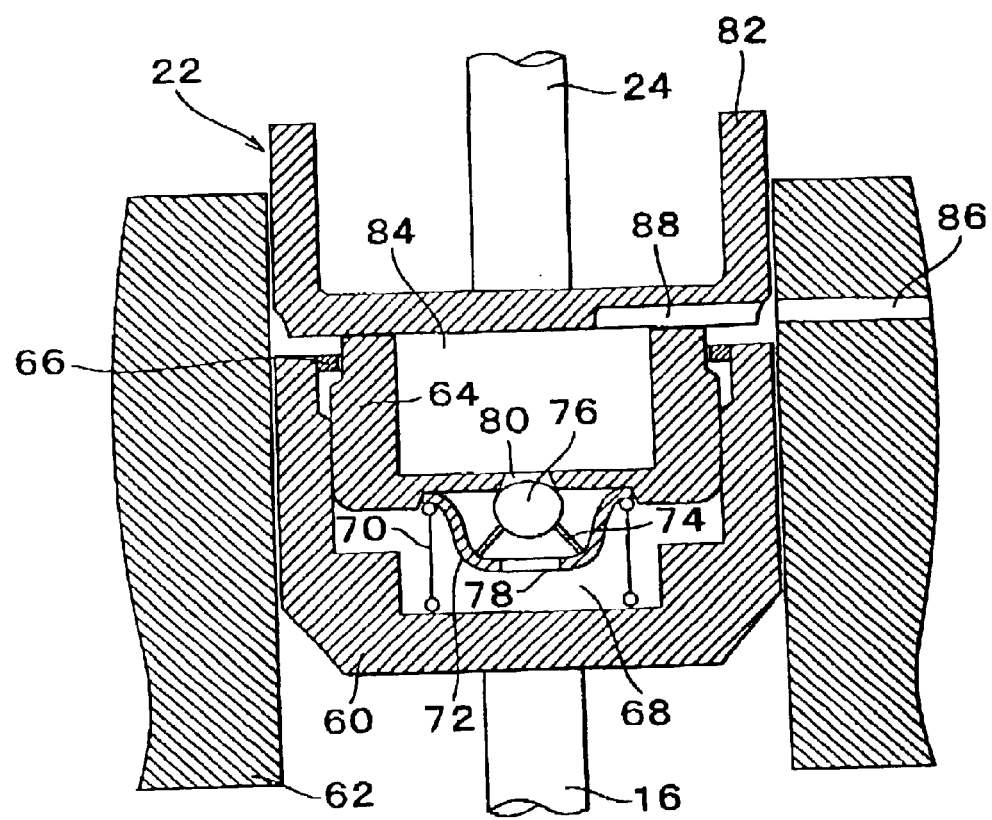
FIG. 2 is a cross sectional view of a rush adjuster provided in an electromagnetic drive valve shown in FIG. 1.

FIG. 2 is a cross sectional view of the rush adjuster 22. The rush adjuster 22 is provided with a first plunger 60. The first plunger 60 is a substantially cylindrical member in which a lower end side is formed as a closed end, and is held inside an adjuster guide 62 in such a manner as to be capable of sliding in an axial direction. A lower end surface of the first plunger 60 is in contact with an upper end of the valve shaft 16.

A second plunger 64 is arranged inside the first plunger 60. Further, a stopper ring 66 for restricting a movement of the second plunger 64 is provided in an opening side end portion (an upper side end portion in FIG. 2) of the first plunger 60. The second plunger 64 can slide inside the first plunger 60 in an axial direction within a range allowed by the stopper ring 66.

A pressure chamber 68 which is defined by an inner wall of the first plunger 60 and an outer wall of the second plunger 64 is formed inside the first plunger 60. A retainer 72 which is pushed toward the second plunger 64 by a spring 70 is arranged in an inner portion of the pressure chamber 68. Further, a ball valve 76 which is pushed toward the second plunger 64 by a spring 74 is arranged inside the retainer 72. The retainer 72 is provided with a communication hole 78 which communicates an interior space and an exterior space of the retainer 72. Further, a communication hole 80 which is opened and closed by the ball valve 76 is formed on the second plunger 64.

A reservoir cap 82 is arranged in the adjuster guide 62 so as to be in contact with the upper end of the second plunger 64. The reservoir cap 82 is a member which is in contact with the lower end of the armature shaft 24, and can slide inside the adjuster guide 62 in the axial direction together with the first plunger 60. A reservoir chamber 84 which is enclosed by an inner wall of the second plunger 64 and an outer wall of the reservoir cap 82 is formed inside the second plunger 64. The reservoir chamber 84 is communicated with the pressure chamber 68 when the ball valve 76 mentioned above moves apart from the communication hole 80 so as to connect the communication hole 80, and on the contrary, is disconnected from the pressure chamber 68 when the ball valve 76 closes the communication hole 80.

An oil supply passage 86 is provided in the adjuster guide 62. Oil is supplied to the oil supply passage 86 from an oil supply source (not shown). An oil groove 88 for communicating the reservoir chamber 84 with the oil supply passage 86 is formed in the reservoir cap 82. Accordingly, oil is suitably supplied to the reservoir chamber 84 from the oil supply passage 86.

Next, a description will be given of an operation of the rush adjuster 22.

When a compression force in the axial direction is applied between the armature shaft 24 and the valve shaft 16, the second plunger 64 tries to relatively move downward inside the first plunger 60. Since the communication hole 80 of the second plunger 64 is closed by the ball valve 76, an internal pressure of the pressure chamber 68 is increased when the second plunger 64 tries to relatively move in the manner mentioned above, so that the force by which the ball valve 76 tries to close the communication hole 76 is further increased. Accordingly, in the case that the compression force is applied between the armature shaft 24 and the valve shaft 16, the second plunger 64 simply moves relatively with respect to the first plunger 60 little by little as a small amount of oil leaks out from the gap between the second plunger 64 and the first plunger 60. Therefore, in a broad view, the first plunger 60 and the second plunger 64 become in the sane state as the fixed state.

On the contrary, when an extension force in the axial direction is applied between the armature shaft 24 and the valve shaft 16 in a state in which the pressure chamber 68 is compressed, the second plunger 64 becomes in a state capable of relatively moving upward with respect to the first plunger 60. Since the upward energizing force generated by the spring 70 is applied to the second plunger 64, the relative movement is caused in the second plunger 64 when the state mentioned above in established, whereby the pressure chamber 68 is expanded. When the pressure chamber 68 is expanded, a capacity of the pressure chamber 68 increases, whereby an internal pressure thereof becomes lower than an internal pressure of the reservoir chamber 84. Accordingly, the ball valve 76 is pressed to a side of the pressure chamber 68 having a low internal pressure from the reservoir chamber 64 having a high internal pressure, and the ball valve 76 opens the communication hole 80. When the ball valve 76 opens the communication hole 60, the reservoir chamber 84 and the pressure chamber 68 are brought in a communicative state, and a hydraulic pressure which prevents the second plunger 64 from relatively moving upward is lost. As a result, the first plunger 60 and the second plunger 64 relatively move in a direction of expanding the rush adjuster 22 until the extension force mentioned above is lost.

In the electromagnetic drive valve 10 shown in FIG. 1(A), in the case that the armature 26 is positioned near the middle position, the compression force is applied between the valve shaft 16 and the armature shaft 24 due to the energizing force of the lower spring 20 and that of the upper spring 30. Further, also in the case that the armature 26 is attached to the lower core 38 and the valve body 12 is at the full-open position the compression force which is produced by the energizing force of the lower spring 20 and the electromagnetic force generated by the lower core 38 is applied between the valve shaft 16 and the armature shaft 24.

Further, if the state in which the armature 26 is attached to the upper core 42 before the valve body 12 sits on the valve seat 14 is established, then in that case as well the compression force which is produced by the energizing force generated by the lower spring 20 and the electromagnetic force generated by the upper core 42 is applied between the valve shaft 16 and the armature shaft 24. That is, if the state mentioned above is established, the rush adjuster 22 receives the compression force successively irrespective of the state of the electromagnetic drive valve 10.

As described above, the rush adjuster 22 has a high rigidity against the compression force in a broad view. However, in the case that the rush adjuster 22 is subjected to the compression force successively, the length thereof in the axial direction is contracted as the oil leaks from the pressure chamber 68 little by little (refer to FIG. 2). Therefore, in accordance with the rush adjuster 22, even in the state in which the armature 26 is attached to the upper core 42 before the valve body 12 sits on the valve seat 14, the rush adjuster 22 is contracted and absorbs the amount by which the valve body 12 is apart from the valve seat 14 because the valve body 12 is not completely seated on the valve seat 14, whereby it is possible to effectively prevent establishment of the state in which the valve body 12 is not seated on the valve seat 14.

On the contrary, if the valve body 12 sits on the valve seat 14 before the armature 26 reaches the upper core 42, the extension force is then applied between the valve shaft 16 and the armature shaft 24. In this case, the rush adjuster 22 expands its outer size until the extension force is lost.

As described above, the rush adjuster 22 adjusts its own outer size to a proper size in a self-aligned manner so that the valve body 12 sits on the valve seat 14 at a time when the armature 26 is attached to the upper core 42. Therefore, in accordance with the electromagnetic drive valve 10 of the present embodiment, the state in which the valve body 12 properly sits on the valve seat 14 can constantly be maintained without being affected by factors such as the thermal expansion of the valve body 12 and the valve shaft 16.

In this case, the rush adjuster 22 has, as mentioned above, a property of compressing its outer size in correspondence to the continuous application of the compression force. In the present embodiment, the compression force is successively applied to the rush adjuster 22 during the stop of the electromagnetic valve 10. Accordingly, when the electromagnetic drive valve 10 is started after placed in a stopped state for a long time, there is a case in which the rush adjuster 22 becomes in a most contracted state FIG. 1(B) shows a state in which the exciting current is supplied to none of the lower coil 40 and the upper coil 44 and the rush adjuster 22 is in a most contracted state. On the assumption that an outer size of the most contracted state shown in FIG. 1(B) is smaller than an outer size shown in FIG. 1(A) by ΔL, the position of the lover retainer 18 in FIG. 1(B) becomes higher than the position in FIG. 1(A) by ΔL/2, while the position of the upper retainer 28 in FIG. 1(B) becomes lower than the position in FIG. 1(A) by ΔL/2. As a result, the position of the armature 26 shown in FIG. 1(B) becomes lower than the position shown in FIG. 1(A) by ΔL/2.

In this case, Ute outer size of the rush adjuster 22 shown in FIG. 1(A) is a predetermined outer size which is smaller than an outer size in a most expanded state and larger than the outer size in the most contracted state, that is, a normal outer size which is expected to be used in a normal state. Accordingly, the position of the armature 26 shown in FIG. 1(A) is the normal position which is expected to be used in the normal state. Further, this normal position is, as mentioned above, a position which corresponds to a middle position between the lower core 38 and the upper 42.

As described above, in the electromagnetic drive valve 10 according to the present et when the rush adjuster 22 becomes in the most contracted state because of the log time stop, a state is established in which the position of the armature 26 is moved by ΔL/2 to the side of the lower core 38 from the normal position, that is, the position corresponding to the middle position between the lower core 38 and the upper core 42.

When starting the electromagnetic drive valve 10, it is necessary to attach the armature 26 to the lower core 38 or the upper care 42 against the energizing force of the lower spring 20 and the upper spring 30. In the present embodiment, the ECU 50 alternately supplies the exciting current to the lower coil 40 and the upper coil 44 in accordance with a suitable cycle, and increases the amplitude of the armature 26 so as to moves the position of the armature 26 to the lower core 38 or the upper core 42.

At this time, the shorter the distance between the lower core 38 and the armature 26 or between the upper core 42 and the armature 26, the smaller the exciting current needed to make the both be attached to each other. Accordingly, in the case the armature 26 is offset to one of the lower core 30 and the upper core 42 at a tire of starting the electromagnetic drive valve 10, the electromagnetic drive valve 10 can be started more effectively if the first starting current is supplied to the coil that is on the side where the distance with respect to the armature 26 is shorter. Then, the structure is made such that the ECU 50 starts the electromagnetic drive valve 10 on the basis of a method which is described with reference to FIG. 3.

FIG. 3 shows, according to the present embodiment, waveforms of the electric currents supplied to the upper coil 44 and the lower coil 40 at a time of starting the electromagnetic drive valve 10 (FIGS. 3 (A) and 3 (B)) and a displacement caused in the valve body 12 (FIG. 3(C). As shown in FIGS. 3(A) and 3 (B), according to the present embodiment, the structure is made such that the first starting current is supplied to the lower coil 40 and thereafter the exciting current is alternately supplied to the upper coil 44 and the lower coil 40.

As mentioned above, according to the present embodiment, on the basis of the property of the rush adjuster 22, during the long time stop of the electromagnetic drive valve 10, the position of the armature 26 moves to the position closer to the lower core 38 from the middle position between the lower core 38 and the upper core 42. Therefore, in accordance with the starting method shown in FIG. 3, the armature 26 can be attached to the lower core 38 effectively with the first starting current which is supplied to the lower coil 40. Thus, in accordance with the starting method of the present embodiment, it is possible to effectively start the electromagnetic drive valve 10 provided with the rush adjuster 22.

Meanwhile, according to the embodiment 1 mentioned above, it is set such that the first starting current is always supplied to the lower coil 40 on the assumption that the armature 22 is always on the side closer to the lower coil 40 at a tire of starting the electromagnetic drive valve 10, however, the invention is not limited to this. That is, there is a case that the rush adjuster 22 is expanded more than the expected normal outer sire, during the operation of the electromagnetic drive valve 10. In this case, the position of the armature 26 moves closer to the upper core 42 relative to the middle position between the lower core 38 and the upper core 42. After this state is established, when the electromagnetic drive valve 10 is restarted after a short stop, the restarting is executed in a state in which the armature 26 is on the side closer to the upper coil 44 than the lower coil 40, because the rush adjuster 22 is not returned to the normal outer size.

In order to effectively start the electromagnetic drive valve 10 at a time of the restarting mentioned above, it is desirable that the first starting current is not supplied to the lower coil 40 but the upper coil 44. Therefore, assuming the aforementioned case where the position of the armature 26 deviates from the middle position between the lower core 38 and the upper core 42, the structure may be made such that the ECU 50 at first detects the position of the armature 26 by the position sensor 96 at a time of starting the electromagnetic drive valve 10, then judges which of the lower coil 40 and the upper coil 44 the position of the armature 26 is closer to, and consequently supplies the first starting current to the coil which is judged to be closer to the armature 26.

Further, a timer which measures an elapsed time after the operation of the electromagnetic drive valve 10 is stopped nay be provided, so as to determine an amount of the starting current to be supplied to the lower coil 40 on the basis of the elapsed time measured by the timer. Specifically, since the longer the elapsed time after the electromagnetic drive valve 10 is stopped, the more the rush adjuster 22 is contracted and the closer the armature 26 moves towards the lower core 38, the armature 26 can be attached to the lower core 38 with a small starting current. Accordingly, it is possible to effectively drive the electromagnetic drive valve 10 by controlling the amount of the starting current to be supplied to the lower core 38 in inverse proportion to the elapsed time after the electromagnetic drive valve 10 is stopped.

Further, according to the embodiment 1 mentioned above, on the basis of the property of the rush adjuster 22, since the armature 22 tends to move to the position offset to the side of the lower coil 38 when the electromagnetic drive valve 10 is stopped, the structure is made such that the first starting current is always supplied to the lower coil 40, however, the invention is not limited to this embodiment. That is, in the case that the electromagnetic drive valve has a property with which the armature tends to move to the position offset to the side of the upper coil during the stop of the electromagnetic drive valve, the first starting current may always be supplied to the upper coil.

In this case, in the embodiment 1 mentioned above, the ECU 50 which at first applies the starting current to the upper coil 44 or the lower coil 40 whichever the distance with respect to the armature 26 is shorter, corresponds to the "starting current application portion".

Further, in the embodiment mentioned above, the ECO 50 which judges which of the upper coil 44 and the lower coil 40 is closer to the armature 26, on the basis of the output of the position sensor 86 at a time of starting the electromagnetic drive valve 10, corresponds to the "coil judging portion".

Since this invention is structured in the manner mentioned above, the effect shown below can be obtained.

Since the starting current is at first applied to the upper coil or the lower coil whichever the distance with respect to the armature 26 is shorter, a first motion required for moving the armature to the full-open position or the full-close position can be caused with a small exciting current.

Further, the rush adjuster is contracted by being pushed by the lower spring and the upper spring during the stop of the electromagnetic drive valve. As a result, the armature is displaced to the position which is closer to the lower coil than the upper coil during the stop of the electromagnetic drive valve. In accordance with the invention, since the first exciting current is always supplied to the lower coil, the first motion required for starting the electromagnetic drive valve can be caused with a small exciting current.

Further, since the position of the armature is detected by the position sensor, it is possible to surely judge whether the armature is closer to the upper coil or the lower coil, at a time of starting the electromagnetic drive valve.

What is claimed is:

1. A control apparatus of an electromagnetic drive valve, comprising:

a valve body which is provided in the electromagnetic drive valve;

a valve shaft which is fixed to the valve body;

an armature which slides along an axial direction of the valve shaft;

a rush adjuster which adjusts a relative position between the valve body and the armature in the axial direction so that a state of zero-rush is established;

an upper coil which is arranged above the armature so as to generate an electromagnetic force for attracting the armature closer;

a lower coil which is arranged under the armature so as to generate an electromagnetic force for attracting the armature closer; and a starting current application portion which applies a starting current at first to either the upper coil or the lower coil, whichever is closer to the armature, at a time of starting the electromagnetic drive valve.

2. A control apparatus according to claim 1, further comprising:
a lower spring which pushes the valve shaft toward the armature; and
an upper spring which pushes the armature toward the valve shaft,
wherein the rush adjuster is arranged on a side of the lower coil relative to the armature, and has a function of expanding according to an expansion force and contracting according to a continuous compression force,
the lower spring and the upper spring generate an energizing force so that the armature is positioned in a middle position between the upper coil and the lower coil, in the case in which the rush adjuster is in a predetermined state between a most contracted state and a most expanded state,
the armature is positioned on a lower coil side with respect to the middle position between the lower coil and the upper coil or on an upper coil side with respect to the middle position between the lower coil and the upper coil due to contraction or expansion of the rush adjuster, and
the starting current application portion always applies the starting current at first to the coil closer to the armature from among the lower coil and the upper coil at a time of starting the electromagnetic drive valve.

3. A control apparatus according to claim 1, further comprising:
a timer which measures an elapsed time after the electromagnetic drive valve is stopped,
wherein a magnitude of the starting current is controlled on the basis of the elapsed time measured by the timer.

4. A control apparatus according to claim 3, wherein the magnitude of the starting current is reduced in proportion to the elapsed time.

5. A control apparatus according to claim 1, further comprising:
a coil judgement portion which judges which of the upper coil and the lower coil is closer to the armature.

6. A control apparatus according to claim 5, further comprising:
a position sensor which detects a position of the armature in an axial direction of the valve shaft,
wherein the coil judgement portion judges which of the upper coil and the lower coil is closer to the armature, on the basis of the position of the armature detected by the position sensor.

7. A control method of an electromagnetic drive valve provided with a valve body, a valve shaft which is fixed to the valve body, an armature which is slid along an axial direction of the valve shaft, a rush adjuster which adjusts a relative position between the valve body and the armature in an axial direction so that a state of zero-rush is established, an upper coil which is arranged above the armature so as to generate an electromagnetic force for attracting the armature closer, and a lower coil which is arranged under the armature so as to generate an electromagnetic force for attracting the armature closer, comprising:
applying a first starting current to either the upper coil or the lower coil, whichever is closer to the armature, at a time of starting the electromagnetic drive valve.

8. A control method according to claim 7, wherein the rush adjuster is arranged between the armature and the valve shaft, the armature is positioned on a lower coil side with respect to the middle position between the lower coil and the upper coil or on an upper coil side with respect to the middle position between the lower coil and the upper coil due to a contraction or an expansion or the rush adjuster, and the first starting current is always applied to the coil closer to the armature from among the lower coil and the upper coil at a time of starting the electromagnetic drive valve.

9. A control method according to claim 7, wherein a magnitude of the starting current is controlled on the basis of an elapsed time after the electromagnetic drive valve is stopped.

10. A control method according to claim 9, wherein the magnitude of the starting current is reduced in proportion to the elapsed time.

11. A control apparatus according to claim 2, further comprising:
a timer which measures an elapsed time after the electromagnetic drive valve is stopped,
wherein a magnitude of the starting current is controlled on the basis of the elapsed time measured by the timer.

12. A control apparatus according to claim 11, wherein the magnitude of the starting current is reduced in proportion to the elapsed time.

13. A control method according to claim 8, wherein a magnitude of the starting current is controlled on the basis of an elapsed time after the electromagnetic drive valve is stopped.

14. A control method according to claim 13, wherein the magnitude of the starting current is reduced in proportion to the elapsed time.

15. A control apparatus according to claim 1, further comprising:
a lower spring which pushes the valve shaft toward the armature; and
an upper spring which pushes the armature toward the valve shaft,
wherein the rush adjuster is arranged on a side of the lower coil relative to the armature, and has a function of expanding according to an expansion force and contracting according to a continuous compression force,
the lower spring and the upper spring generate an energizing force so that the armature is positioned in a middle position between the upper coil and the lower coil, in a case in which the rush adjuster is in a predetermined state between a most contracted state and a most expanded state,
the armature is positioned on a lower coil side with respect to the middle position between the lower coil and the upper coil or on an upper coil side with respect to the middle position between the lower coil and the upper coil due to contraction or expansion of the rush adjuster,
a relative distance between the lower coil and the armature, and a relative distance between the upper coil and the armature changes with elapsed time, and
the starting current application portion selects one of the lower coil or the upper coil as a coil to which the starting current is applied at first according to the elapsed time, at the time of starting the electromagnetic drive valve.

16. A control apparatus according to claim 15, further comprising:

a timer which measures an elapsed time after the electromagnetic drive valve is stopped, wherein a magnitude of the starting current is controlled on the basis of the elapsed time measured by the timer.

17. A control apparatus according to claim 16, wherein the magnitude of the starting current is reduced in proportion to the elapsed time.

18. A control method according to claim 7, wherein the rush adjuster is arranged between the armature and the valve shaft, the armature is positioned on a lower coil side with respect to the middle position between the lower coil and the upper coil or on an upper coil side with respect to the middle position between the lower coil and the upper coil due to contraction or expansion of the rush adjuster, a relative distance between the lower coil and the armature, and a relative distance between the upper coil and the armature changes with elapsed time, and the starting current application portion selects one of the lower coil or the upper coil as a coil to which the starting current is applied at first according to the elapsed time, at the time of starting the electromagnetic drive valve.

19. A control method according to claim 18, wherein a magnitude of the starting current is controlled on the basis of the elapsed time after the electromagnetic drive valve is stopped.

20. A control method according to claim 19, wherein the magnitude of the starting current is reduced in proportion to the elapsed time.

* * * * *